US009684296B2

(12) United States Patent
Russell, III et al.

(10) Patent No.: US 9,684,296 B2
(45) Date of Patent: Jun. 20, 2017

(54) HANDHELD FIELD MAINTENANCE TOOL WITH IMPROVED FUNCTIONALITY

(75) Inventors: Alden Chester Russell, III, Minnetonka, MN (US); Todd Mitchell Toepke, Eden Prairie, MN (US); Alan Roger Dewey, Plymouth, MN (US); Joseph Citrano, III, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 592 days.

(21) Appl. No.: 12/780,044

(22) Filed: May 14, 2010

(65) Prior Publication Data

US 2010/0290084 A1 Nov. 18, 2010

Related U.S. Application Data

(60) Provisional application No. 61/178,751, filed on May 15, 2009.

(51) Int. Cl.
*G06F 3/12* (2006.01)
*G05B 19/042* (2006.01)
*G06K 15/00* (2006.01)

(52) U.S. Cl.
CPC ............ *G05B 19/0428* (2013.01); *G05B 2219/23406* (2013.01); *G05B 2219/36159* (2013.01)

(58) Field of Classification Search
CPC ........ G05B 19/042; G05B 2219/36159; G05B 2219/23406; G05B 19/0428; G06F 1/163
USPC ..... 358/1.1, 1.9, 1.14, 1.15, 1.18; 700/1, 60; 702/59, 183, 184; 370/230, 224
See application file for complete search history.

(56) References Cited

U.S. PATENT DOCUMENTS

| 2,640,667 A | 5/1950 | Winn |
| 5,079,562 A | 1/1992 | Yarsunas |
| 5,195,392 A | 3/1993 | Moore et al. ................. 73/866.5 |
| 5,309,351 A | 5/1994 | McCain et al. ............... 364/132 |
| 5,442,639 A | 8/1995 | Crowder et al. ............. 371/20.1 |
| 5,903,455 A | 5/1999 | Sharpe, Jr. et al. .......... 364/188 |
| 6,033,226 A | 3/2000 | Bullen .......................... 434/219 |

(Continued)

FOREIGN PATENT DOCUMENTS

| CN | 101763576 | 6/2010 |
| DE | 10245176 | 4/2004 |

(Continued)

OTHER PUBLICATIONS

EPO Communication from related European application No. 10730279.6 dated Jan. 13, 2012.

(Continued)

*Primary Examiner* — Gabriel Garcia
(74) *Attorney, Agent, or Firm* — Christopher R. Christenson; Kelly, Holt & Christenson, PLLC

(57) ABSTRACT

A handheld field maintenance tool with improved functionality is provided. The handheld field maintenance tool includes a keypad, a display, a short-range wireless transceiver and a processor. The processor is coupled to the keypad, the display and the short-range wireless transceiver. The processor is also coupled to memory having a plurality of instructions stored therein, which instructions, when executed by the processor, cause the processor to perform at least one of remote wireless display; remote wireless keypress injection; and wireless printing.

7 Claims, 5 Drawing Sheets

(56) References Cited

U.S. PATENT DOCUMENTS

| | | | |
|---|---|---|---|
| 6,211,649 B1 | 4/2001 | Matsuda | 320/115 |
| 6,236,223 B1 | 5/2001 | Brady et al. | 324/750.3 |
| 6,377,859 B1 | 4/2002 | Brown et al. | 700/79 |
| 6,633,782 B1 | 10/2003 | Schleiss et al. | 700/26 |
| 6,725,182 B2 | 4/2004 | Pagnano et al. | 702/188 |
| 6,971,063 B1 | 11/2005 | Rappaport et al. | 715/733 |
| 7,013,184 B2 | 3/2006 | Romagnoli et al. | 700/17 |
| 7,188,200 B2 | 3/2007 | Griech | 710/100 |
| 7,337,369 B2 | 2/2008 | Barthel et al. | 714/43 |
| 7,400,255 B2 | 7/2008 | Horch | 340/572.7 |
| 7,421,531 B2 | 9/2008 | Rotvold et al. | 710/305 |
| 7,426,452 B2 | 9/2008 | Zielinski | |
| 7,454,252 B2 | 11/2008 | El-Sayed | 700/21 |
| 7,505,819 B2 | 3/2009 | El-Sayed | 700/21 |
| 7,506,812 B2 | 3/2009 | von Mueller et al. | 235/449 |
| 7,675,406 B2 | 3/2010 | Baier et al. | 340/506 |
| 7,733,833 B2 | 6/2010 | Kalika et al. | 370/338 |
| 7,797,061 B2 | 9/2010 | El-Sayed | 700/21 |
| 7,840,912 B2 | 11/2010 | Elias et al. | 715/863 |
| 7,940,508 B2 | 5/2011 | Helfrick et al. | 361/119 |
| 7,965,664 B2 | 6/2011 | Hodson et al. | 370/310 |
| 8,000,815 B2 | 8/2011 | John et al. | 700/18 |
| 8,036,007 B2 | 10/2011 | Woehrle | 363/65 |
| 8,059,101 B2 | 11/2011 | Westerman et al. | 345/173 |
| 8,060,862 B2 | 11/2011 | Eldridge et al. | 717/121 |
| 8,060,872 B2 | 11/2011 | Da Silva Neto | 717/177 |
| 8,074,172 B2 | 12/2011 | Kocienda et al. | 715/263 |
| 8,126,145 B1 | 2/2012 | Tewari et al. | 380/255 |
| 8,150,462 B2 | 4/2012 | Guenter et al. | 455/557 |
| 8,180,948 B2 | 5/2012 | Kreider et al. | 710/313 |
| 8,224,256 B2 | 7/2012 | Citrano, III et al. | 455/67.11 |
| 2001/0047504 A1 | 11/2001 | Aoyama | 714/799 |
| 2002/0004370 A1 | 1/2002 | Stengele et al. | 455/39 |
| 2002/0007237 A1 | 1/2002 | Phung et al. | 701/33 |
| 2002/0027504 A1 | 3/2002 | Davis et al. | 340/540 |
| 2002/0030844 A1* | 3/2002 | Tuli | 358/1.15 |
| 2002/0065873 A1 | 5/2002 | Ishizuka | 709/203 |
| 2002/0086642 A1 | 7/2002 | Ou et al. | 455/69 |
| 2002/0167904 A1 | 11/2002 | Borgeson et al. | 370/241 |
| 2002/0171558 A1* | 11/2002 | Bartelheim et al. | 340/825.49 |
| 2002/0188466 A1* | 12/2002 | Barrette et al. | 705/2 |
| 2003/0050737 A1 | 3/2003 | Osann, Jr. | 700/276 |
| 2003/0109937 A1* | 6/2003 | Zielinski et al. | 700/1 |
| 2003/0204373 A1 | 10/2003 | Zielinski et al. | 702/184 |
| 2003/0229472 A1 | 12/2003 | Kantzes et al. | 702/183 |
| 2004/0039458 A1 | 2/2004 | Mathiowetz et al. | 700/17 |
| 2004/0111238 A1 | 6/2004 | Kantzes et al. | 702/183 |
| 2004/0193287 A1 | 9/2004 | Lefebvre et al. | 700/1 |
| 2004/0204193 A1 | 10/2004 | Li et al. | 455/575.1 |
| 2004/0228184 A1 | 11/2004 | Mathiowetz | 365/202 |
| 2004/0230327 A1 | 11/2004 | Opheim et al. | 700/83 |
| 2005/0106927 A1 | 5/2005 | Gotto | |
| 2005/0114086 A1 | 5/2005 | Zielinski et al. | 702/184 |
| 2005/0138186 A1 | 6/2005 | Hesselink | |
| 2005/0164684 A1 | 7/2005 | Burr | |
| 2005/0222698 A1 | 10/2005 | Eryurek et al. | 700/90 |
| 2005/0223120 A1 | 10/2005 | Scharold et al. | 710/1 |
| 2006/0014533 A1 | 1/2006 | Warren | 455/423 |
| 2006/0087402 A1 | 4/2006 | Manning et al. | 340/3.1 |
| 2006/0155908 A1 | 7/2006 | Rotvold et al. | 710/315 |
| 2006/0161393 A1 | 7/2006 | Zielinski et al. | 702/184 |
| 2006/0206277 A1 | 9/2006 | Horch | 702/82 |
| 2006/0290496 A1 | 12/2006 | Peeters | 340/572.1 |
| 2006/0291438 A1 | 12/2006 | Karschnia et al. | 370/338 |
| 2007/0161352 A1 | 7/2007 | Dobrowski et al. | 455/69 |
| 2007/0161371 A1 | 7/2007 | Dobrowski et al. | 455/423 |
| 2007/0179645 A1 | 8/2007 | Nixon et al. | 700/83 |
| 2007/0208279 A1 | 9/2007 | Panella et al. | 600/595 |
| 2008/0114911 A1 | 5/2008 | Schumacher | 710/72 |
| 2008/0125175 A1 | 5/2008 | Guenter | |
| 2008/0234837 A1 | 9/2008 | Samudrala et al. | 700/19 |
| 2008/0268784 A1 | 10/2008 | Kantzes et al. | 455/66.1 |
| 2009/0065578 A1 | 3/2009 | Peterson et al. | 235/382 |
| 2009/0094466 A1 | 4/2009 | Matthew et al. | 713/300 |
| 2009/0125713 A1 | 5/2009 | Karschnia et al. | 713/153 |
| 2009/0171483 A1 | 7/2009 | Scheuermann | 700/83 |
| 2009/0177970 A1 | 7/2009 | Jahl et al. | 715/735 |
| 2009/0271726 A1 | 10/2009 | Gavimath et al. | 715/771 |
| 2009/0284390 A1 | 11/2009 | Lahner et al. | 340/825.49 |
| 2009/0296601 A1 | 12/2009 | Citrano et al. | 370/254 |
| 2009/0326852 A1 | 12/2009 | Vetter et al. | 702/108 |
| 2010/0100766 A1 | 4/2010 | Bengtsson et al. | 714/23 |
| 2010/0114347 A1 | 5/2010 | Dheenathayalan et al. | 700/97 |
| 2010/0114549 A1 | 5/2010 | Kolavi | 703/13 |
| 2010/0145476 A1* | 6/2010 | Junk | G05B 19/042 700/7 |
| 2010/0220630 A1 | 9/2010 | Kalika et al. | 370/254 |
| 2010/0290351 A1 | 11/2010 | Toepke et al. | 370/250 |
| 2010/0290359 A1 | 11/2010 | Dewey et al. | 370/252 |
| 2010/0293363 A1 | 11/2010 | Meyer et al. | 713/1 |
| 2011/0117529 A1 | 5/2011 | Barash et al. | 434/265 |
| 2011/0238188 A1 | 9/2011 | Washiro | 700/19 |
| 2012/0038458 A1 | 2/2012 | Toepke et al. | 340/6.1 |
| 2012/0038548 A1 | 2/2012 | Toepke et al. | 345/156 |
| 2012/0038760 A1 | 2/2012 | Kantzes et al. | 348/61 |
| 2012/0040316 A1 | 2/2012 | Mathiowetz et al. | 434/219 |
| 2012/0040698 A1 | 2/2012 | Ferguson et al. | 455/457 |
| 2012/0041744 A1 | 2/2012 | Kantzes et al. | 703/13 |
| 2012/0046911 A1 | 2/2012 | Mathiowetz et al. | 702/184 |

FOREIGN PATENT DOCUMENTS

| | | |
|---|---|---|
| DE | 102007035158 | 1/2009 |
| DE | 102008029406 | 12/2009 |
| DE | 102009028195 | 2/2011 |
| EP | 1515208 | 3/2005 |
| EP | 1916582 | 4/2008 |
| EP | 2071427 | 6/2009 |
| EP | 2077473 | 7/2009 |
| EP | 2148259 | 1/2010 |
| EP | 2204705 | 7/2010 |
| GB | 2382418 | 5/2003 |
| GB | 2 394 124 | 4/2004 |
| JP | 9051583 | 2/1997 |
| JP | 11202904 | 7/1999 |
| JP | 2001337004 | 7/2001 |
| JP | 2007-91381 | 4/2007 |
| JP | 2008520050 | 6/2008 |
| JP | 2008165193 | 7/2008 |
| JP | 2009105895 | 5/2009 |
| KR | 20060078883 | 7/2006 |
| RU | 43161 U1 | 1/2005 |
| WO | WO 01/35190 | 5/2001 |
| WO | WO 02/086662 | 10/2002 |
| WO | WO 2006/016845 | 2/2006 |
| WO | WO 2006/022429 | 3/2006 |
| WO | WO 2008/042074 | 4/2008 |
| WO | WO 2008/077358 | 7/2008 |
| WO | WO 2008/087571 | 7/2008 |
| WO | WO 2008/096216 | 8/2008 |
| WO | WO 2008/127632 | 10/2008 |
| WO | WO 2009/003146 | 12/2008 |
| WO | WO 2009/003148 | 12/2008 |
| WO | WO 2009/074544 | 6/2009 |

OTHER PUBLICATIONS

EPO Communication from related European application No. 10730281.2 dated Jan. 13, 2012.
EPO Communication from corresponding European application No. 10725543.2 dated Jan. 12, 2012.
Technical Data Sheet: VIATOR® USB HART® Interface (Model 010031). MACTek Measurement and Control Technologies.
David Gustafsson: "WirelessHART—Implementation and Evaluation on Wireless Sensors". Masters's Degree Project, KTH University, Electrical Engineering, Apr. 1, 2009, pp. 1-39, XP002596602, Stockholm, Sweden. Retrieved from the Internet: URL:http://www.ee.kth.se/php/modules/publications/reports/2009/XR-EE-RT%202009:003.pdf.
Invitation to Pay Additional Fees for international patent application No. PCT/US2010/034949 dated Sep. 17, 2010.

(56) References Cited

OTHER PUBLICATIONS

VIATOR® Bluetooth® Wireless Technology Interface for use with HART field devices. MACTek Measurement and Control Technologies retrieved from www.mactekcorp.com/product5.htm.
Product Data Sheet: VIATOR RS232. MACTek Measurement and Control Technologies retrieved from www.mactekcorp.com/product1.htm.
ABB Limited: "Wireless Instrumentation Jargon Buster". Information bulletin instrumentation ABB No. IB/INST-018, Mar. 3, 2009, XP002596601. Retrieved from the Internet: URL:http://www05.abb.com/global/scot/scot203.nsf/veritydisplay/be00ec76ef07e978c125756e003157b9/$File/IB_INST_018_1.pdf.
Notification of Transmittal of the International Search Report and the Written Opinion from the International Application No. PCT/US2010/021764.
Possio Bluetooth to WLAN Gateway PX20: Full Product Description retrieved from http://www.blueunplugged.com/p.aspx?p=105816.
1420 Wireless Gateway: Product Data Sheet 00813-0100-4420, Rev BA Mar. 2008. Emerson Process Management.
Smart Wireless Gateway (WirelessHART™). Quick Installation Guide 00825-0200-4420, Rev BA. Aug. 2009. Emerson Process Management.
1420 Wireless Gateway. Reference Manual 00809-0100-4420, Rev BA. Aug. 2007. Emerson Process Management.
Rosemount 3051S Wireless Series Scalable Pressure, Flow, and Level Solutions. Reference Manual 00809-0100-4802, rev BA. Aug. 2007. Emerson Process Management.
Notification of Transmittal of the International Search Report and the Written Opinion from the International Application No. PCT/US2010/034949.
Notification of Transmittal of the International Search Report and the Written Opinion from the International Application No. PCT/US2010/034889.
EPO Communication pursuant to Rules 161(1) and 162 EPC for European patent application No. 10701430.0 dated Aug. 30, 2011.
Invitation to pay additional fees from the related International patent application No. PCT/US2011/045679 dated Aug. 6, 2012.
Invitation to pay additional fees from the related International patent application No. PCT/US2011/045664 dated Aug. 9, 2012.
Invitation to pay additional fees from the related International patent application No. PCT/US2011/045676 dated Jul. 30, 2012.
Lee S W et al: "Honam Petrochemical Corporation Uses Simulator for Ethylene Plant Operator Training", Processing of the Industrial Computing Conference. Houston, Oct. 18-23, 1992. pp. 219-222.
Kurrle H-P et al.: "Trainingssimulator Zur Ausbildung Von Chemikanten und Anlagenfahrern. Otraining Simulator for the Training of Process Workers (Chemikanten) and Operators", Automatisierungsteehnische Praxis—ATP, Oldenbourg Indusrieverlag, Munchen, DE, vol. 36, No. 7, Jul. 1, 1994. Abstract, Section 2.
Invitation to pay additional fees from the related International patent application No. PCT/US2011/045665 dated Aug. 23, 2012.
Bushman J B: "Ally: An Operator's Associate for Cooperative Supervisory Control Systems", IEEE Transactions on Systems, Man and Cybernetics, IEEE Inc. New York, US, vol. 23, No. 1, Jan. 1, 1993, pp. 111-128.
First Communication for the related European patent application No. 107302812 dated Oct. 11, 2012.
International Search Report and Written Opinion from the related International patent application No. PCT/US2011/045664 dated Nov. 6, 2012.
International Search Report and Written Opinion from the related International patent application No. PCT/US2011/045679 dated Nov. 6, 2012.
International Search Report and Written Opinion from the related International patent application No. PCT/US2011/045665 dated Nov. 6, 2012.
First Communication from corresponding European patent application No. 107255432 dated Oct. 11, 2012.
Rosemount 3051SMV Quick Installation Guide 00825-0100-4803 Rev BA. Apr. 2011.
Notification of Transmittal of the International Search Report and the Written Opinion from the International Application No. PCT/US2011/045680 dated Jul. 6, 2012.
Notification of Transmittal of the International Search Report and the Written Opinion from the International Application No. PCT/US2011/045681 dated Jan. 5, 2012.
Invitation to Pay Additional Fees from the International Application No. PCT/US2011/045673 dated Jan. 16, 2012.
475 Field Communicator. User's Guide XP007919976. Aug. 2009. www.fieldcommunicator.com by Emerson Process Management.
Office Action from corresponding Chinese patent application No. 201080011949.1 dated Mar. 26, 2013.
Office Action from related Japanese patent application No. 2012511041, dated Feb. 12, 2013.
Office Action from corresponding Russian application No. 2011151065 dated Feb. 7, 2013.
Office Action from corresponding Japanese patent application No. 2012511035, dated Feb. 26, 2013.
Office Action from related Russian application No. 2011151063 dated Mar. 12, 2013.
First Communication from related European patent application No. 107302796 dated Oct. 19, 2012.
Office Action from related Russian application No. 2011151063 dated Nov. 12, 2012.
First Office Action from related Japanese application No. 2015511048, dated Jan. 29, 2013.
Russian Patent Application No. 2011151065, Notification of Results of Checking Patentability of Invention, dated Jun. 18, 2013. 9 pages.
Chinese Patent Application No. 201080012851.8, First Office Action dated Jul. 15, 2013, 15 pages.
Second Office Action from counterpart Chinese Patent Application No. 201080011949.1, issued on Dec. 31, 2013. 7 pages.
Office Action from counterpart Japanese Patent Application No. 2012-511035, dispatched on Nov. 5, 2013. 5 Pages.
Rejection Decision from Chinese Application No. 201080011949.1, issuing date Jun. 5, 2014. 10 pages.
Reexamination Notification from counterpart Chinese Patent Application No. 201080011949.1 dated Dec. 25, 2014, 10 pages with English translation.
European Summons to Attend Oral Proceedings for European Patent Application No. 10725543.2, dated Feb. 6, 2017, 6 pages.

\* cited by examiner

HANDHELD FIELD MAINTENANCE TOOL WITH IMPROVED FUNCTIONALITY

CROSS-REFERENCE TO RELATED APPLICATION

The present application is based on and claims the benefit of U.S. provisional patent application Ser. No. 61/178,751 filed May 15, 2009, the content of which is hereby incorporated by reference in its entirety.

BACKGROUND

Handheld field maintenance tools are known. Such tools are highly useful in the process control and measurement industry to allow operators to conveniently communicate with and/or interrogate field devices in a given process installation. Examples of such process installations include petroleum, pharmaceutical, chemical, pulp, and other fluid processing installations. In such installations, the process control and measurement network may include tens or even hundreds of various field devices which periodically require maintenance to ensure that such devices are functioning properly and/or calibrated. Moreover, when one or more errors in the process control and measurement installation are detected, the use of a handheld field maintenance tool allows a technician to quickly diagnose such errors in the field. Handheld field maintenance tools are generally used to configure, calibrate, and diagnose problems relative to intelligent field devices using digital process communication protocols.

Since at least some process installations may involve highly volatile, or even explosive, environments, it is often beneficial, or even required, for field devices and the handheld field maintenance tools used with such field devices to comply with intrinsic safety requirements. These requirements help ensure that compliant electrical devices will not generate a source of ignition even under fault conditions. One example of Intrinsic Safety requirements is set forth in: APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS NUMBER 3610, promulgated by Factory Mutual Research October, 1998. An example of a handheld field maintenance tool that complies with intrinsic safety requirements includes that sold under trade designation Model 475 Field Communicator, available from Emerson Process Management of Austin, Tex.

Given the unique environmental considerations for field devices, communication signaling has traditionally been carefully controlled. Examples of industrial process communication protocols include the Highway Addressable Remote Transducer (HART®) Protocol, and the FOUNDATION™ Fieldbus Protocol. Both of these protocols are considered wired protocols in that a physical wire connection is made to each field device.

SUMMARY

A handheld field maintenance tool with improved functionality is provided. The handheld field maintenance tool includes a keypad, a display, a short-range wireless transceiver and a processor. The processor is coupled to the keypad, the display and the short-range wireless transceiver. The processor is also coupled to memory having a plurality of instructions stored therein, which instructions, when executed by the processor, cause the processor to perform at least one of remote wireless display; remote wireless keypress injection; and wireless printing.

DETAILED DESCRIPTION OF ILLUSTRATIVE EMBODIMENTS

Figure 1A:
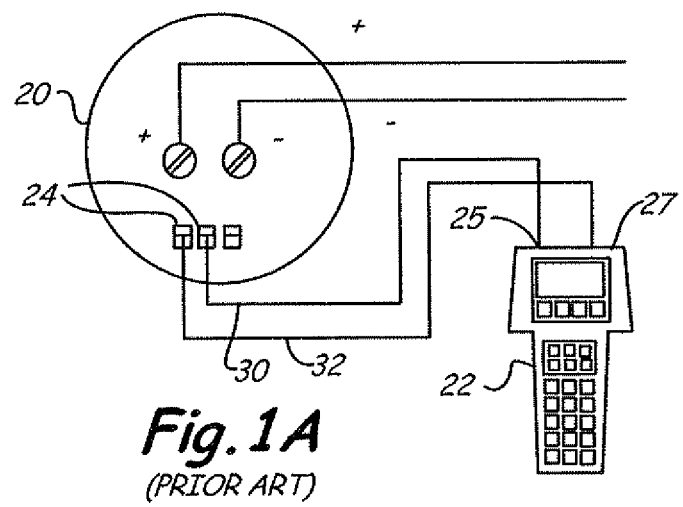
FIGS. 1A and 1B are diagrammatic views of a handheld field maintenance tool coupled to a field device in accordance with the prior art.
Figure 1B:
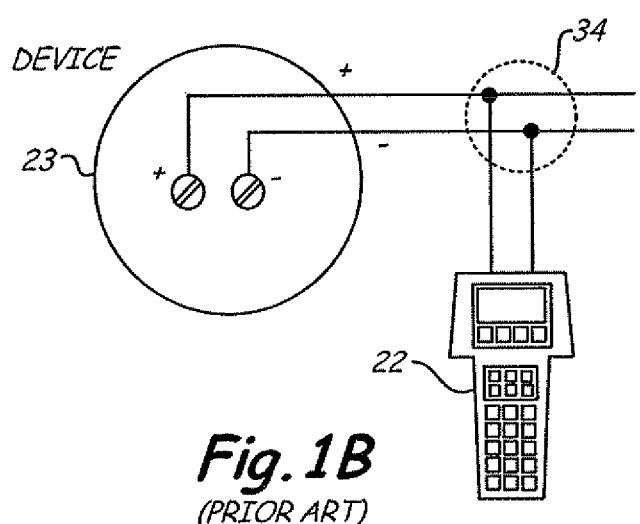

FIGS. 1A and 1B are diagrammatic views of a handheld field maintenance tool 22 coupled to field devices in accordance with the prior art. As shown in FIG. 1A, handheld field maintenance tool 22 includes a pair of terminals 25, 27 that couple to test leads 30, 32, respectively, which are then coupled to terminals 24 of field device 20. Terminals 24 may be dedicated terminals to allow such a handheld field maintenance tool to couple to device 20 and interact with device 20.

FIG. 1B shows an alternate arrangement where handheld field maintenance tool 22 couples directly to the process control loop 34 to which field device 23 is coupled. In either case, the wired connection between the handheld field maintenance tool and the field device allows the handheld field maintenance tool to interact with the desired field device 20, 23.

Figure 2:
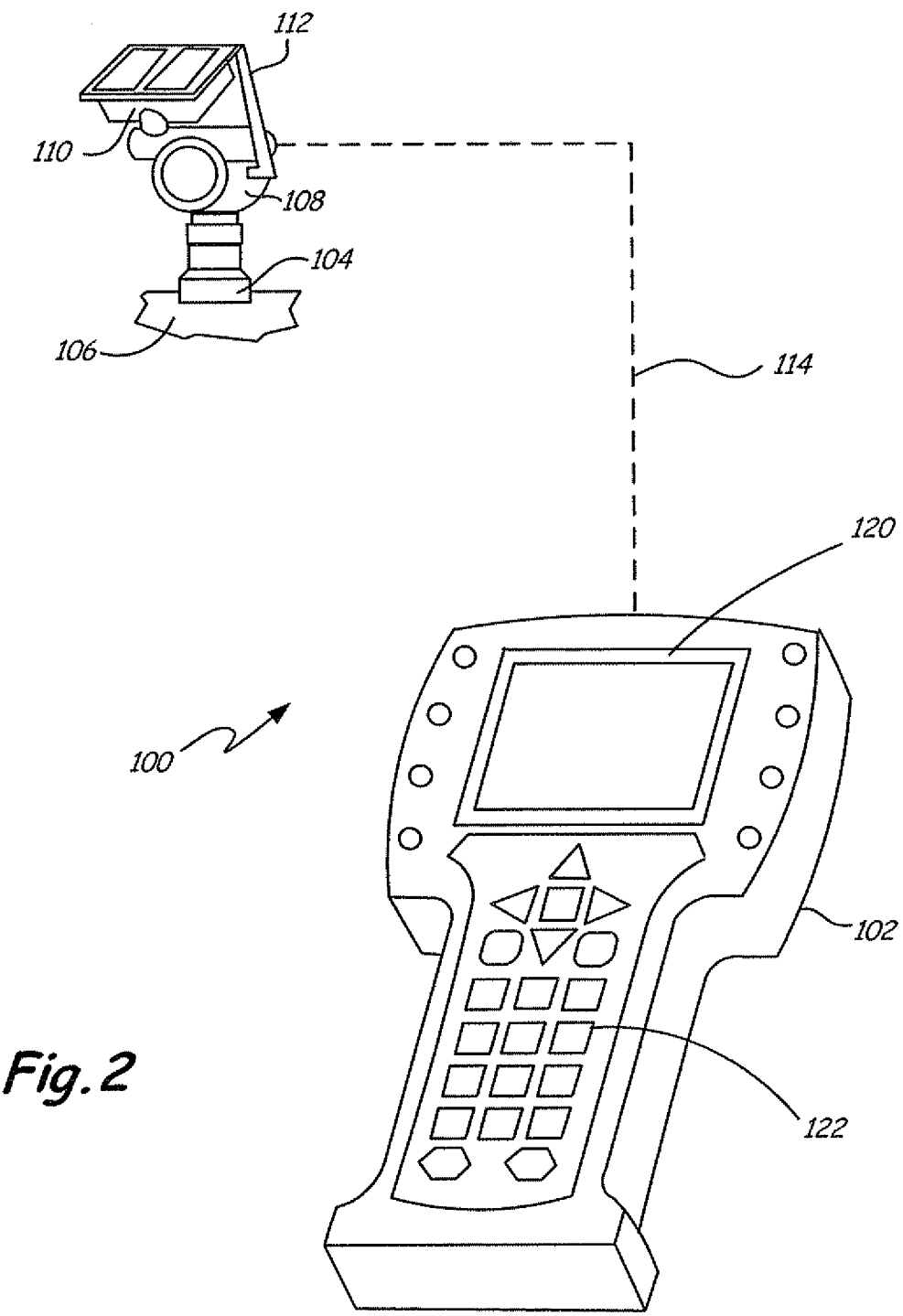
FIG. 2 is a diagrammatic view of a handheld field maintenance tool with which embodiments of the present invention are particularly useful.

FIG. 2 is a diagrammatic view of a handheld field maintenance tool interacting with a field device in accordance with an embodiment of the present invention. System 100 includes handheld field maintenance tool 102 communicating with field device 104.

Handheld field maintenance tool 102 is communicatively coupled to field device 104 via communication link 114. Communication link 114 can take any suitable form including wired connections as shown in FIGS. 1A and 1B, as well as wireless communication techniques that are currently being used or being developed. Handheld field maintenance tool 102 allows a technician to interact with field device 104 to configure, calibrate, and/or diagnose problems with respect to field device 104 using a digital process communication protocol such as FOUNDATION™ Fieldbus and/or the HART® protocol. Handheld field maintenance tools, such as tool 102 can be used to save configuration data from field devices, such as field device 104. Field device 104 may be any device that senses a variable in the process and transmits information related to the variable over a process communication loop; such as a pressure or temperature transmitter. Field device 104 may also be a device that receives information from a process communication loop and sets a physical parameter, such as a valve closure, based on the information. Field device 104 is depicted as an industrial process fluid pressure transmitter having a pressure manifold 106 coupled thereto, and an electronics enclosure 108. Field device 104 is provided for illustrative purposes only. In reality, field device 104 may be any industrial device, such as a process fluid temperature transmitter, process fluid level transmitter, process fluid flow transmitter, valve controller, or any other device that is useful in the measurement and/or control of industrial processes.

For the various field devices, configuration data can be transferred to a suitable device that may employ application software to organize, format, and/or print such configuration data in an easily readable form.

Handheld field maintenance tool 102 generally includes a user interface that comprises a display 120 as well as a number of user input buttons 122. Display 120 may be any suitable display such as an active-matrix liquid crystal display, or any other suitable display that is able to provide useful information. Buttons 122 may comprise any suitable arrangement of buttons relative to any number of functions to which the handheld field maintenance tool may be directed. Buttons 122 may comprise a numeric keypad, an alphanumeric keypad, any suitable number of custom functions and/or navigation buttons, or any combination thereof. Due to handheld field maintenance tool 102 being sized to be carried by a technician for extended periods of time and to be held in the hand during use, display 120 and keys 122 are generally relatively small. This is typically not a problem when handheld field maintenance tool 102 is held in the hand, but it does create difficulties if the technician is trying to illustrate use of the handheld field maintenance tool to others that must view display 120 and keys 122 from a relative distance.

Embodiments of the present invention generally provide improved functionality for a handheld field maintenance tool by taking advantage of a relatively short-range wireless communication transceiver utilized by the handheld field maintenance tool. One example of such a relatively short-range radio frequency transceiver is that in accordance with a known Bluetooth specification, such as Bluetooth Specification 2.1 rated at Power Class 2.

Figure 3:
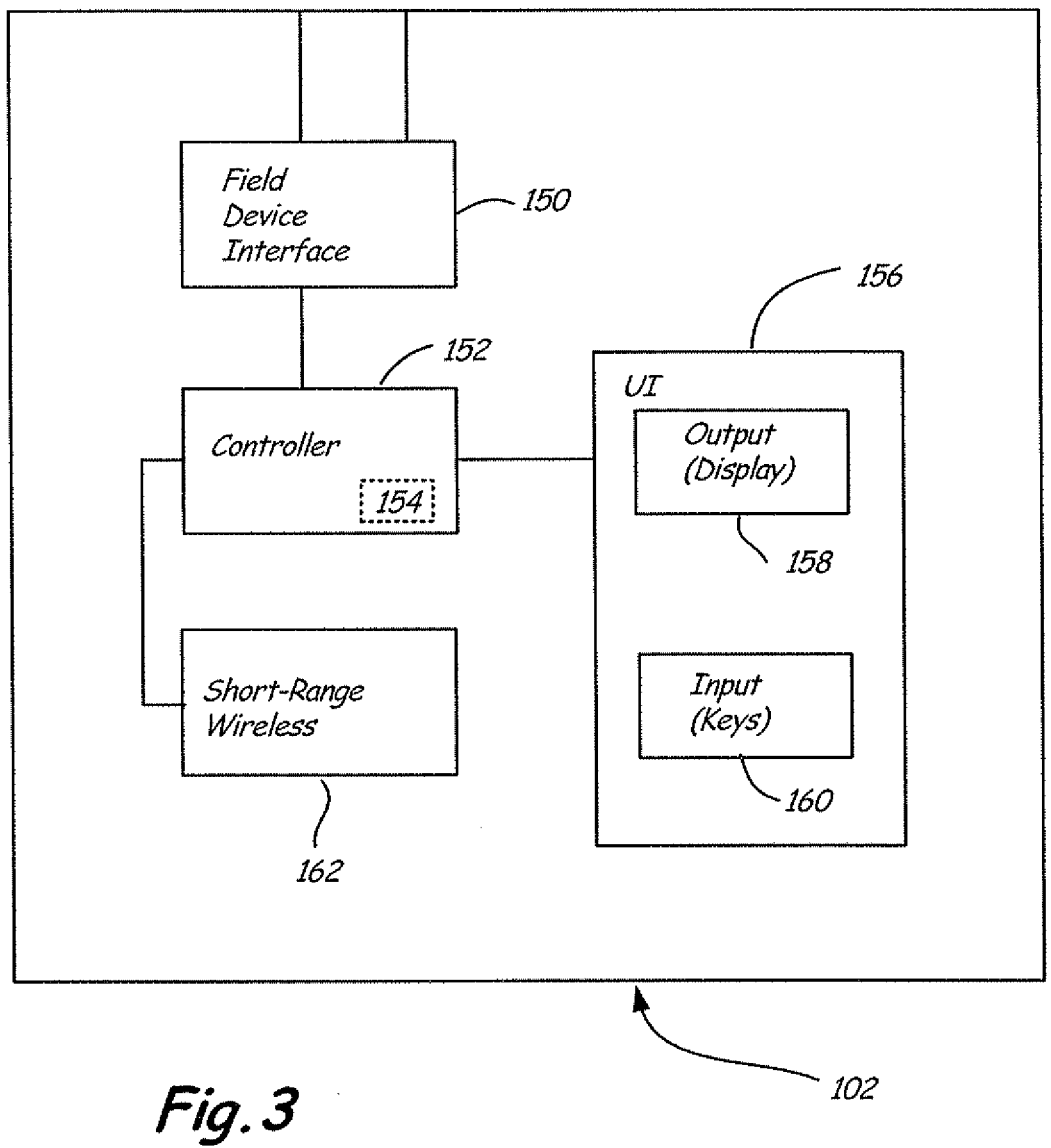
FIG. 3 is a system block diagram of a handheld field maintenance tool with which embodiments of the present invention are particularly useful.

FIG. 3 is a block diagram of handheld field maintenance tool 102 with which embodiments of the present invention are particularly applicable. Tool 102 includes a field device interface 150 operably coupled to controller 152 which is preferably a microprocessor. Field device interface 150 can take any suitable form. For example, in embodiments where the handheld field maintenance tool couples to field devices via a wired connection, field device interface 150 may include one or more wired process communication modules. Examples include a process communication module that allows communication in accordance with the HART® protocol, or a process communication module that allows communication in accordance with the FOUNDATION™ Fieldbus protocol. In other embodiments, field device interface 150 may include wireless process communication circuitry, such as the more recently-developed WirelessHART communication. Additionally, new wired or wireless process communication techniques and protocols can be used in accordance with embodiments of the present invention.

Controller 152 preferably includes, or is coupled to, memory 154 that stores data used by and/or acquired by handheld field maintenance tool 102 during operation. Additionally, memory 154 preferably includes software instructions that, when executed by processor 152, cause processor 152 to execute a number of improved functions. Examples of these improved functions will be provided in greater detail later in the specification.

Handheld field maintenance tool 102 includes user interface 156 operably coupled to controller 152. User interface 156 may include an output 158 in the form of a display and an input 160 in the form of one or more keys or buttons. While embodiments of the present invention are generally described with respect to the user input being the form of keys or buttons, any suitable input can be received from the user or technician. Other examples include dials, knobs, thumbwheels, switches, audio input, cursor control input, et cetera.

Handheld field maintenance tool 102 also includes short-range wireless transceiver 162 coupled to controller 152. In a preferred embodiment, transceiver 162 is a Bluetooth communication module that allows communication in accordance with a known Bluetooth specification, such as Bluetooth Specification 2.1 rated at Power Class 2. However, alternate protocols, such as Wi-Fi wireless networking technologies (IEEE 802.11(b), IEEE 802.11(g) wireless networking devices built by Linksys of Irvine, Calif.).

As set forth above, one of the functions of handheld field maintenance tools is the configuration and commissioning of field devices, such as process fluid pressure or temperature measuring devices. These handheld field maintenance tools can be used to save configuration data from such field devices. The configuration data is acquired by the handheld field maintenance tool 102 via its field device interface module 150. This information is preferably stored in memory within handheld field maintenance tool 102, such as memory 154. Memory 154 can be volatile memory, such as RAM, non-volatile memory, such as ROM, or flash memory or any combination thereof. Typically, in order to print or otherwise use the configuration information, the handheld field maintenance tool must be coupled to a computer via a suitable interface, such as a serial connection, or infrared communication connection to upload the configuration information to the computer. Thereafter, the information is formatted as desired by the computer and printed, stored, or otherwise employed.

In accordance with an embodiment of the present invention, the short-range wireless communication module is employed in conjunction with instructions executed by processor 152 to allow the handheld field maintenance tool 102 to automatically discover and/or pair with a wirelessly-communicating printing device, such as a Bluetooth-enabled printer. Once a device is discovered and available, controller 152 is able to format configuration data for direct printing by the printer. Accordingly, no computer or other such computing device is required in that the configuration information can be printed directly from the wirelessly-communicating printer based upon wireless information transmitted from the handheld field maintenance tool directly to the printer. This is important because a computer is not generally considered very portable and even laptop computers are generally not considered safe enough to be carried into potentially explosive environments. Accordingly, such computers have generally been prohibited from highly explosive or flammable environments. In contrast, the provision of a low-power intrinsically safe printer could be carried with the technician into such environments. Further still, even if such printers were not intrinsically safe, the wireless communication could span a physical barrier where the tool itself is in an explosive environment, but the printing occurs in a safe environment.

Figure 4:
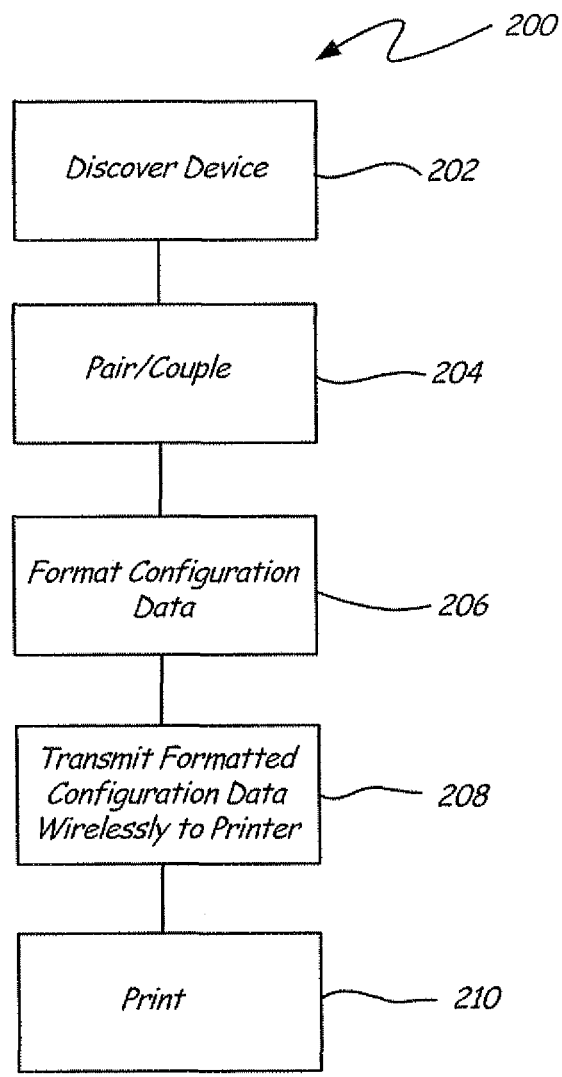
FIG. 4 is a flow diagram of a method of printing field device configuration data from a handheld field maintenance tool directly to a printer in accordance with an embodiment of the present invention.

FIG. 4 is a flow diagram of a method of printing configuration data from a handheld field maintenance tool in accordance with an embodiment of the present invention. Method 200 begins at block 202 where a handheld field maintenance tool, such as tool 102, discovers the communicative proximity of a short-range wireless-compatible printer. Communicative proximity is intended to mean that the handheld field maintenance tool is within the wireless transmission range of both the short-range wireless transceiver 162 and the transceiver of the printing device. Once the device is discovered, method 200 continues at block 204 where the handheld field maintenance tool pairs, couples, or otherwise establishes suitable handshakes to generate a session or job with the printing device. At block 206, the configuration information stored within memory, such as memory 154, is formatted based upon the printer. For example, if the printer reveals that it has a print width of 40 characters, the formatting at block 206 can be adjusted accordingly. Next, at block 208, the formatted configuration information is transmitted wirelessly, via a short-range wireless transceiver such as transceiver 162, to the printer. Then, at block 210, the printer prints the received formatted configuration information Another important function provided by embodiments of the present invention is the facilitation of training, or otherwise showing others, the interactions that a technician or user is generating with the handheld field maintenance tool. Typically, handheld field maintenance tools have a relatively small screen and small numeric or alphanumeric keypad. Since the screens on handheld field maintenance tools are small, it is difficult to view them from a distance. This becomes a problem in a training situation where the user might want to view the handheld field maintenance tool screen on a personal computer and, in turn, project it on a screen. It is possible to connect handheld field maintenance tools to personal computers using hard-wired cables employing, for example, the Ethernet protocol so that the display can be communicated from the handheld field maintenance tool to the personal computer. However, there are some drawbacks to this approach. First, the handheld field maintenance tool must have an Ethernet interface (such as an RJ-45 socket) on the handheld field maintenance tool itself in order to accept the cable. The presence of such a connector would make it difficult, if not impossible, to comply with intrinsic safety requirements for a handheld field maintenance tool. Additionally, the wired interface can make it difficult to move the handheld field maintenance tool around or to locate it a distance from the personal computer. Finally, the wired interface requires the personal computer to also have an Ethernet connector that is available to plug in the cable from the handheld field maintenance tool. While virtually all personal computers generally have an Ethernet connector, the connector is generally consumed by an Ethernet connection to the network so that the computer can interact with other servers or devices. It is somewhat rare for a computer to have an unused Ethernet connector.

In accordance with another embodiment of the present invention, a controller, such as controller 152 of a handheld field maintenance tool, uses a relatively short-range wireless transceiver, such as transceiver 162, to communicate graphical information displayed on a display of the handheld field maintenance tool to a third device, such as a personal computer, for display on the personal computer. Additionally, the transceiver can also be used to show key presses and keystrokes or other forms of user input received by the handheld field maintenance tool on the personal computer or external display device. The system can also work in the reverse in that, when suitably configured, the handheld field maintenance tool can receive keystrokes from the personal computer and/or display information from the personal computer. This may be particularly useful in situations where the handheld field maintenance tool is coupled directly to a field device located in an inconvenient location where the requisite position of the handheld field maintenance tool is not conducive to user input. In such an instance, the technician could return to a computer, potentially disposed at a safe and/or convenient location, and interact with the handheld field maintenance tool using the short-range wireless transceiver.

Figure 5:
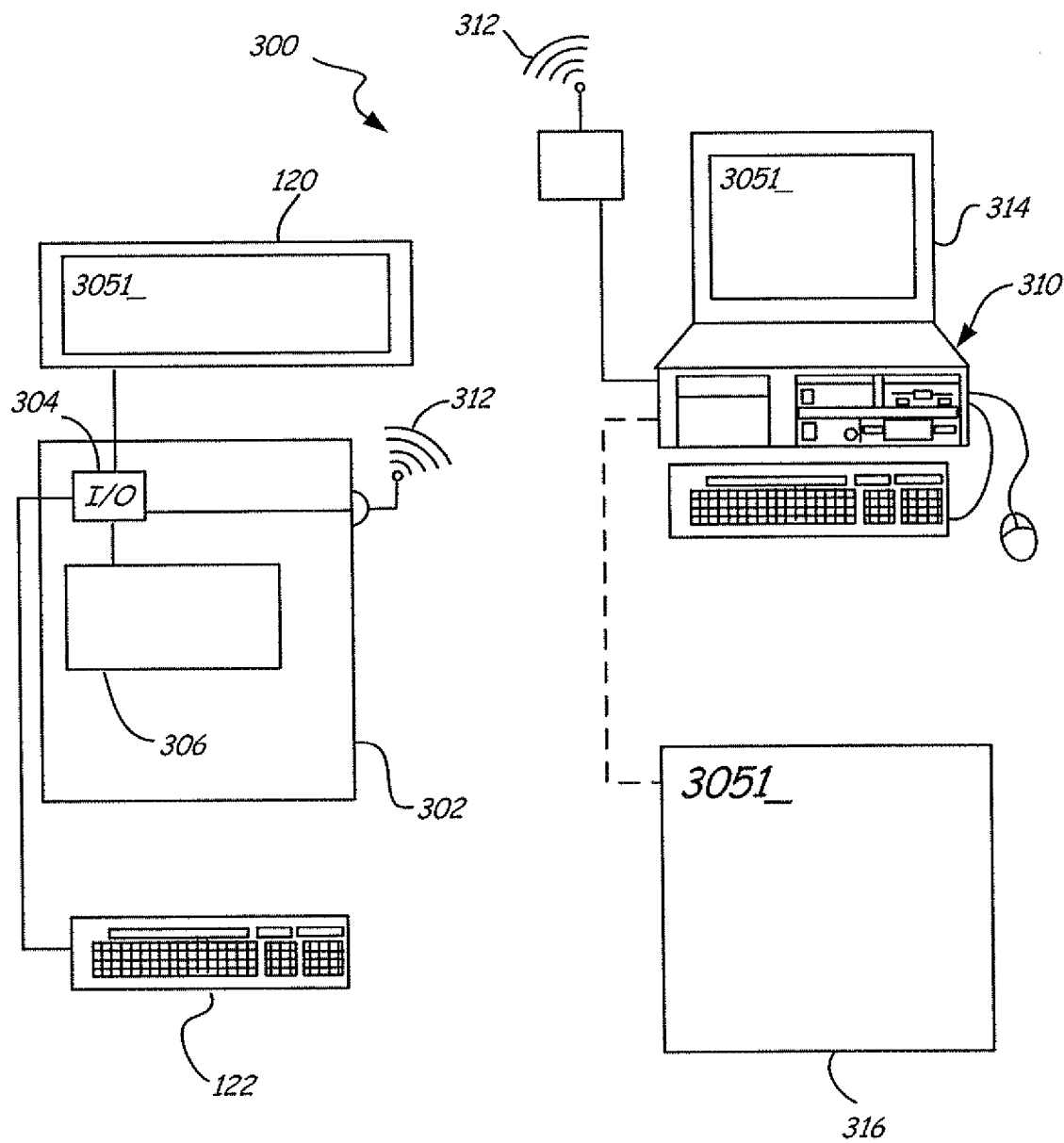
FIG. 5 is a diagrammatic view of a system for remotely displaying information from a handheld field maintenance tool using wireless communication in accordance with an embodiment of the present invention.

FIG. 5 is a diagrammatic view of a system for mirroring interaction on a handheld field maintenance tool via wireless communication in accordance with an embodiment of the present invention. System 300 includes operating system software 302 being executed by controller 152 in a handheld field maintenance tool, such as tool 102. Operating system 302 includes an input/output module 304 that facilitates interaction with physical devices, such as output display 120, keys 122, and short-range wireless transceiver 162 (shown in FIG. 3). Application software 306 runs on top of operating system 302 and provides an improved mirroring function for the handheld field maintenance tool in an embodiment of the present invention.

In accordance with an embodiment of the present invention shown in FIG. 5, keystrokes and/or display outputs from keys 122, and display 120, respectively, can be mirrored to computing device 310 via wireless communication 312. Wireless communication is particularly advantageous in that the handheld field maintenance tool may be disposed in a potentially hazardous or inconvenient location or in a location that is simply not very accessible to a technician. However, computing device 310 is located in a safe, convenient location and generally has a screen or other suitable display 314 that can be viewed by a number of people. In some situations where a large number of people must view the screen, an optional external screen such as an overhead projector 316 can be coupled to computer 310, either directly or indirectly, and can display the output from the handheld field maintenance tool in substantially real-time. Additionally, individual key presses can be viewed or otherwise displayed on screens 314 and/or 316 in any suitable manner. While communication from the handheld field maintenance tool to computing device 310 facilitates training or other interactions where a relatively large number of people who may wish to view the interaction, communication from the computing device 310 to the handheld field maintenance tool is also useful. Particularly, communication from computing device 310 to the handheld field maintenance tool is useful in situations where the handheld field maintenance tool is physically coupled to a field device in a position that is relatively inaccessible. Thus, instead of the technician coupling the handheld field maintenance tool to a field device and interacting with the device while precariously balanced on a ladder, for example, the technician can simply return to computing device 310 and perform interactions with the field device via the handheld field maintenance tool in the safe location of computing device 310 with relative ease.

Although the present invention has been described with reference to preferred embodiments, workers skilled in the art will recognize that changes may be made in form and detail without departing from the spirit and scope of the invention.

What is claimed is:

1. A method of interacting with a field device located in a relatively inaccessible location using an intrinsically-safe handheld field maintenance tool, the method comprising:

physically coupling the intrinsically-safe handheld field maintenance tool to the field device via a field device interface that comprises a plurality of wired process communication modules;

providing an operating system having an I/O module, wherein the intrinsically-safe handheld field maintenance tool has a local display that is driven, at least in part, by the I/O module;

providing wireless communication information from the intrinsically-safe handheld field maintenance tool to a remote device, the wireless communication information being indicative, at least, of alphanumeric display information;

receiving the wireless communication information at the remote device and rendering at least an alphanumeric display by the remote device based on the wireless communication information;

wherein the intrinsically-safe handheld field maintenance tool is physically coupled to the field device; and receiving the wireless communication information from the remote device and causing the I/O module to inject at least one keystroke based on the received wireless communication information.

2. The method of claim 1, wherein the wireless communication information is in accordance with a Bluetooth specification.

3. The method of claim 1, wherein the intrinsically-safe handheld field maintenance tool is located in a hazardous location.

4. The method of claim 1, wherein the display rendered by the remote device is larger than the local display.

5. The method of claim 1, wherein the local display of the handheld field maintenance tool is mirrored to the display rendered by the remote device.

6. The method of claim 5, wherein the mirroring is done in real-time.

7. The method of claim 1, wherein individual keystrokes on the intrinsically-safe handheld field maintenance tool are rendered on the display of the remote device.

* * * * *